US007469329B2

(12) United States Patent
Kuczynski et al.

(10) Patent No.: US 7,469,329 B2
(45) Date of Patent: Dec. 23, 2008

(54) METHODS FOR DYNAMICALLY RESIZING MEMORY POOLS

(75) Inventors: Wojciech Kuczynski, Oshawa (CA); Adam J. Storm, Toronto (CA); Roger Luo Quan Zheng, Richmond Hill (CA); Sarah Posner, Toronto (CA); Christian Marcelo Garcia-Arellano, Richmond Hill (CA); Sam Sampson Lightstone, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 11/278,133

(22) Filed: Mar. 30, 2006

(65) Prior Publication Data
US 2007/0233990 A1  Oct. 4, 2007

(51) Int. Cl.
*G06F 12/02* (2006.01)
(52) U.S. Cl. .................. 711/170; 711/159; 711/171; 711/172; 707/101; 707/205; 707/206; 718/104
(58) Field of Classification Search .................. 711/170
See application file for complete search history.

(56) References Cited

U.S. PATENT DOCUMENTS

| | | | | | |
|---|---|---|---|---|---|
| 5,440,692 | A | * | 8/1995 | Janicek ..................... | 707/101 |
| 5,675,797 | A | * | 10/1997 | Chung et al. ............... | 718/104 |
| 5,784,701 | A | * | 7/1998 | Greenstein et al. .......... | 711/173 |
| 6,430,665 | B1 | * | 8/2002 | Allison et al. ............... | 711/172 |
| 6,542,978 | B2 | * | 4/2003 | Goldstein et al. ........... | 711/170 |
| 6,724,390 | B1 | * | 4/2004 | Dragony et al. ............. | 345/543 |
| 7,318,076 | B2 | * | 1/2008 | Chen et al. .................. | 707/204 |
| 2004/0168037 | A1 | * | 8/2004 | Dearth et al. ............... | 711/173 |
| 2005/0081210 | A1 | * | 4/2005 | Day et al. .................... | 718/104 |
| 2007/0033325 | A1 | * | 2/2007 | Sinclair ....................... | 711/103 |

\* cited by examiner

*Primary Examiner*—Matt Kim
*Assistant Examiner*—Hetul Patel
(74) *Attorney, Agent, or Firm*—Sughrue Mion, PLLC

(57) ABSTRACT

There are disclosed methods for dynamically resizing memory pools used by database management systems. In one aspect, if a decrease in allocation to the memory pool is required, at least one page grouping that may be freed from the memory pool is identified as a candidate based on its position in a list of page groupings. If the page grouping contains any used memory blocks, the used memory blocks may be copied from a candidate page grouping to another page grouping in the list in order to free the candidate page grouping. Once the candidate page grouping is free of used memory blocks, the candidate page grouping may be freed from the memory pool. As an example, this method may be used for dynamically resizing locklists or lock memory.

7 Claims, 12 Drawing Sheets

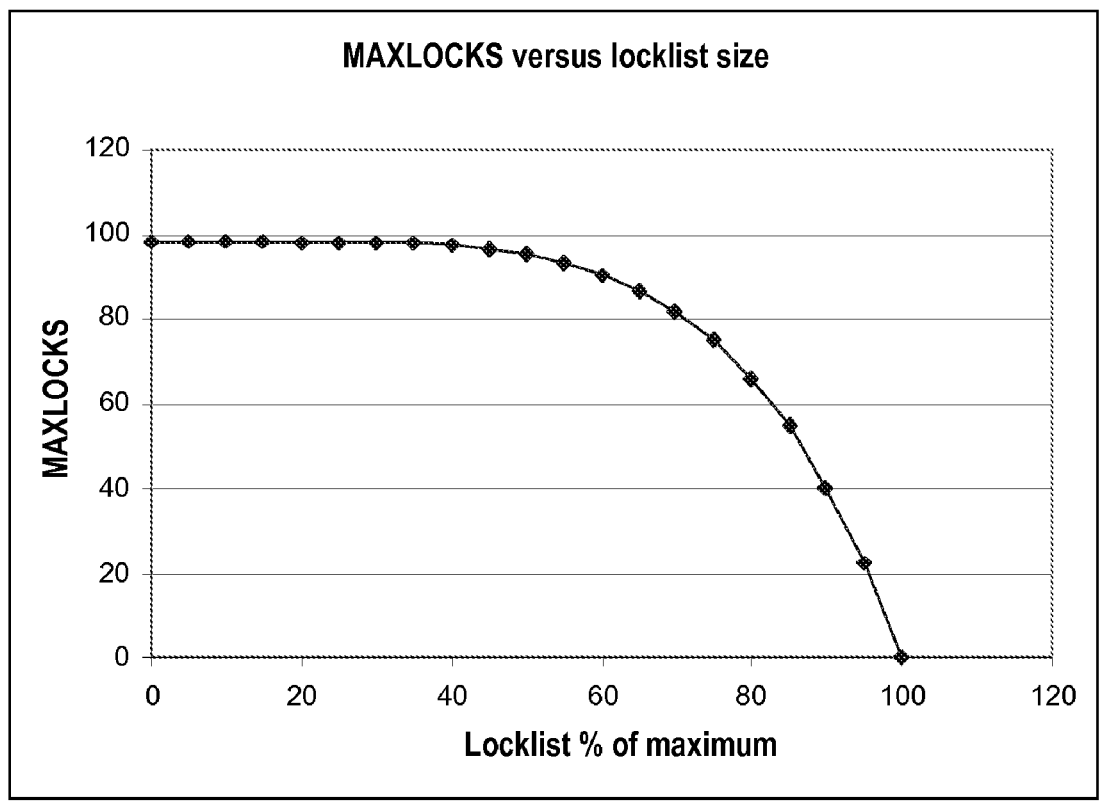
FIG. 10 — 1000

METHODS FOR DYNAMICALLY RESIZING MEMORY POOLS

BACKGROUND

The present invention relates to methods for resizing memory pools for database management systems.

In typical database management system architectures, limited memory resources need to be allocated and shared by many different memory consumers. Efficient sharing of memory is particularly important in database architectures running on 32-bit data processing systems with a maximum addressable memory of 4 GB. Even on 64-bit data processing systems that may address a much larger memory space, given the cost of high performance random access memory and solid-state disks, memory may still be a limited system resource that needs to be allocated and shared.

By way of example, one of these memory consumers may be a lock memory associated with each database. This lock memory is also commonly known as a "lock heap" or "locklist", and provides a memory pool for various database agents or processes for storing locks while processing various database transactions. For example, during processing of a query, a database agent may request locks to a number of records in a database table to prevent another agent from accessing and altering the records. As will be explained in detail further below, locklist memory resources must be carefully allocated in order to achieve functional or performance goals.

Heretofore, memory pools such as locklists have been configured as a contiguous block of memory that cannot be decreased in size without deactivating/reactivating the database. This limitation has restricted the ability of database administrators to resize a memory pool after a peak period for improved database performance. Systems, computer program products, and methods for resizing memory pools, such as locklists, without deactivation/reactivation of a database are needed.

SUMMARY

The present invention relates to systems, computer program products, and methods for dynamically resizing memory pools used by database management systems.

In an aspect of the invention, there is provided a data processing system implemented method for resizing a memory pool in a database management system, comprising: i) forming the memory pool from at least one page grouping; ii) if an increase in allocation to the memory pool is required, adding at least one page grouping to the memory pool to form a chain of page groupings; iii) if a decrease in allocation to the memory pool is required, identifying at least one page grouping free of used memory blocks that may be freed from the memory pool, and freeing the at least one page grouping from the memory pool.

In an embodiment, the method further comprises: iv) if no page groupings that may be freed from the memory pool are identified in iii), then copying used memory blocks from a candidate page grouping to another page grouping in order to free the candidate page grouping of used memory blocks; v) once the candidate page grouping is free of used memory blocks, freeing the candidate page grouping from the memory pool.

In another embodiment, the method further comprises identifying a candidate page grouping that may be freed from the memory pool based on the amount of free memory blocks in the page grouping.

In another embodiment, each page grouping comprises a plurality of pages each including a page header pointing to a page grouping control block associated with the page grouping, and each page grouping control block contains information about whether memory blocks in the page grouping are free or used, and the method further comprises accessing the page grouping control block to determine the location of free memory blocks in the page grouping.

In yet another embodiment, the method further comprises organizing the page groupings into a list of page groupings based on the amount of free memory blocks in each page grouping, and identifying the candidate page grouping for freeing based on its order in the list of page groupings.

In still another embodiment, the method further comprises preferentially using memory blocks from a page grouping based on its position in the list of page groupings such that memory blocks are used from fewer page groupings, whereby fragmentation of used memory blocks amongst the page groupings is decreased.

In another embodiment, the memory pool is a locklist, and the memory block is a lock request block in the locklist.

These and other aspects of the invention will become apparent from the following more particular descriptions of exemplary embodiments.

BRIEF DESCRIPTION OF THE DRAWINGS

In the figures which illustrate exemplary embodiments:

FIG. 10 shows a graph of a parameter representing the maximum portion of locklist memory that may be consumed by a single transaction, as plotted against the total of the percentage of locks used.

DETAILED DESCRIPTION

As noted above, the present invention relates to systems, computer program products, and methods for resizing memory pools, such as locklists, used by database management systems.

Figure 1:
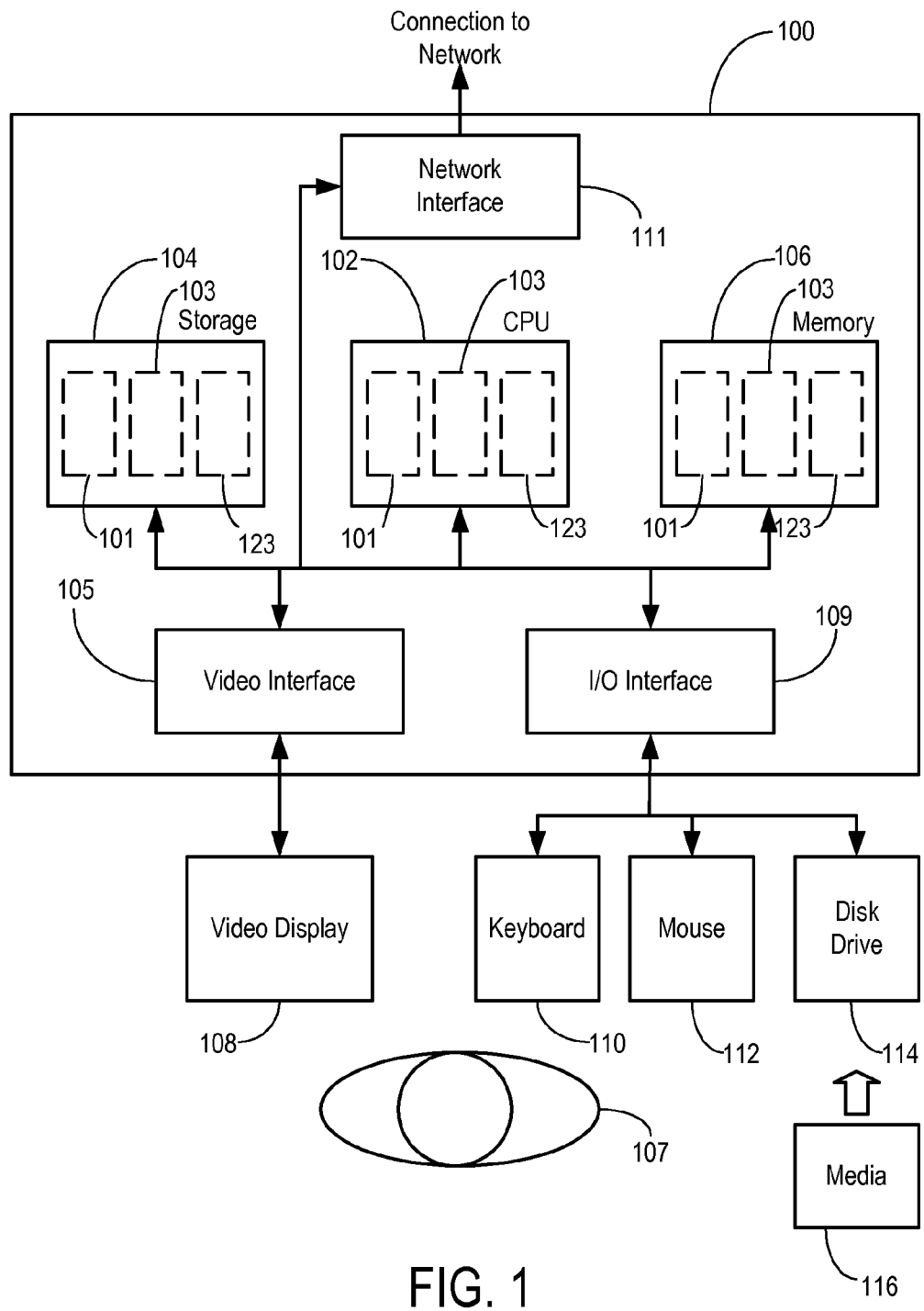
FIG. 1 shows a generic data processing system that may provide a suitable operating environment.

The invention may be practiced in various embodiments. A suitably configured data processing system, and associated communications networks, devices, software and firmware may provide a platform for enabling one or more of the systems, computer program products, and methods. By way of example, FIG. 1 shows a generic data processing system 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. An operator 107 may interact with the data processing system 100 using a video display 108 connected by a video interface 105, and various input/output devices such as a keyboard 110, mouse 112, and disk drive 114 connected by an I/O interface 109. In known manner, the mouse 112 may be configured to control movement of a cursor in the video display 108, and to operate various graphical user interface ("GUI") controls appearing in the video display 108 with a mouse button. The disk drive 114 may be configured to accept data processing system readable media 116. The data processing system 100 may form part of a network via a network interface 111, allowing the data processing system 100 to communicate with other suitably configured data processing systems (not shown).

Furthermore, the invention can take the form of a computer program product comprising or accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

In an embodiment, application program 103 of data processing system 100 may be a database management system (DBMS) application. The DBMS application program 103 may be embodied as code that may be stored in storage unit 104, and loaded into random access memory 106 and CPU 102 for processing. Data associated with the DBMS application program 103 may be stored in storage unit 104 as database records and tables. The DBMS application software 103 may be run as a standalone application program on data processing system 100, or as a networked client server application program operatively connected to other data processing systems via network interface 111. The particular configurations shown and described by way of example in this specification are not meant to be limiting.

In this specification, various features of the IBM™ DB2 Universal Database™ (UDB) relational database management system (IBM DB2) will be discussed for the purposes of illustration. Table A below provides the terminology that is used to describe database features or configuration parameters. It will be appreciated that this terminology is used for illustrative purposes only, and is not meant to limit the general scope of the invention as claimed.

TABLE A

| Term | Description |
|---|---|
| Locklist | An area of memory allocated to and used for locks in a database engine. |
| Tuning interval | A time interval determined in part by inputs from memory consumers and used by a memory manager to set the interval to consider for the purposes of tuning various database configuration parameters. For example, tuning intervals may be set somewhere between one minute and ten minutes, although any suitable time interval may be used. |
| LLconfig | A database configuration parameter value that indicates an externally viewable size of a locklist, as seen by a user or database administrator as the currently configured size for the locklist. |
| minSize | A database configuration parameter value that may be used by a memory manager to set a minimum size for a memory pool or heap for each tuning interval. This value is not directly linked to the configuration parameter value LLconfig, but rather represents a constraint that the memory manager must try to achieve at any point in time. Every heap that is tuned by the memory manager may have a specified minSize value. |
| targetSize | This database configuration parameter is the target size for the locklist. The minSize value for a locklist within the memory controller is normally set to the targetSize. |
| LRB (lock request block) | This is an individually addressable memory block in locklist memory used by a lock manager to manage transaction concurrency. LRBs can either be in a used state or in a free state. |
| Page | An aligned unit of memory having a size that is a power of 2 (e.g. a 4K page of aligned memory). Each page stores some fixed number (page size/size of LRB) of LRBs. |
| Page groupings | A logical grouping of contiguous pages in memory aligned on a page sized boundary. For example, 32 pages may be assigned per grouping, for a page grouping size of 128K. |
| Page grouping chain | A list of page groupings forming a locklist. Page groupings may not necessarily be contiguous in memory. |
| Page header | A structure located at the beginning of each page containing a pointer to the page grouping control block. |
| Page grouping control block | A structure containing information about the state of the page grouping. |
| Config size of locklist | A configuration value for the locklist parameter, measured in 4K pages. |
| Actual size of locklist | The configuration value rounded up to the nearest number of pages per page grouping. |
| minRequired | The minimum number of LRBs required by a transaction to complete a lock request |
| Overflow buffer | The portion of the database shared memory set that is not guaranteed for use by any particular memory consumer. The size of the overflow buffer can be calculated from the size of the database shared memory set minus the sum of all guaranteed memory for memory consumers in the set. |

Figure 2A:
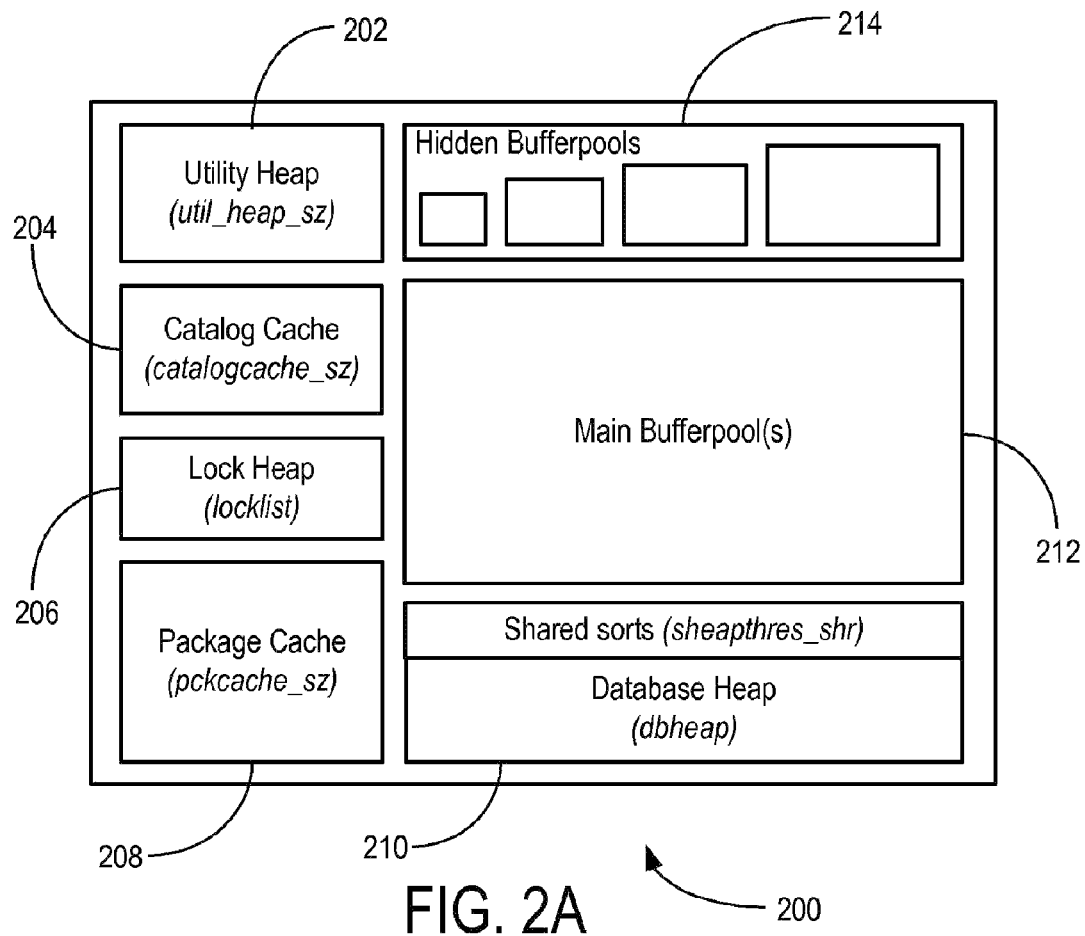
FIG. 2A shows a schematic block diagram of various memory pools that may be found within a database shared memory set.

Now referring to FIG. 2A, shown is an illustrative schematic block diagram of a database shared memory set. As shown, various memory pools within the database shared memory set may include a utility heap 202, a catalog cache 204, a lock heap or locklist 206, a package cache 208, a database heap 210, main buffer pools 212, and hidden buffer pools 214. The database shared memory may be one of a number of memory sets that may be managed by a memory manager, other memory sets including, for example, instance shared memory, application group shared memory, and agent private memory.

As will be described further below, the systems, computer program products, and methods for self-tuning memory pools may require memory consumers to be dynamically adjustable (i.e. adjustable without having to deactivate and reactivate a database). By way of illustration, a dynamically adjustable locklist in accordance with an embodiment is now described.

Dynamically Adjustable Locklist

Figure 2B:
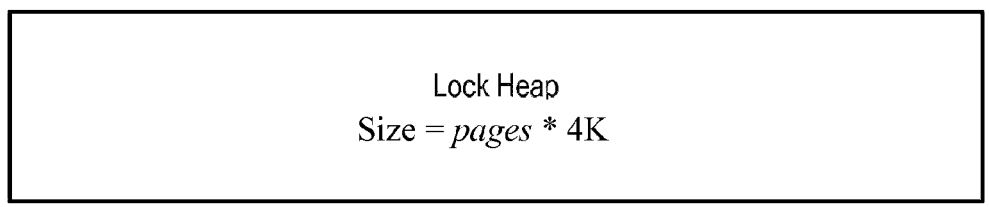
FIG. 2B shows a schematic block diagram of a lock heap or locklist.

As shown in FIG. 2B, heretofore, a locklist 206 typically has been configured as an area of memory allocated as a continuous block. The size of the locklist is determined by the number and size of pages in the locklist. If 4K pages are used, for example, the size of the locklist would be the number of pages*4K.

While the locklist of FIG. 2B is fully functional for its intended purpose, it cannot be decreased in size until all applications have terminated (i.e. a deactivation of the database is required, making a dynamic decrease of the locklist impossible). In order to dynamically adjust the size of the locklist without reactivating the database, it has been found necessary to breakdown the locklist memory block of FIG. 2B into smaller sections.

Figure 3A:
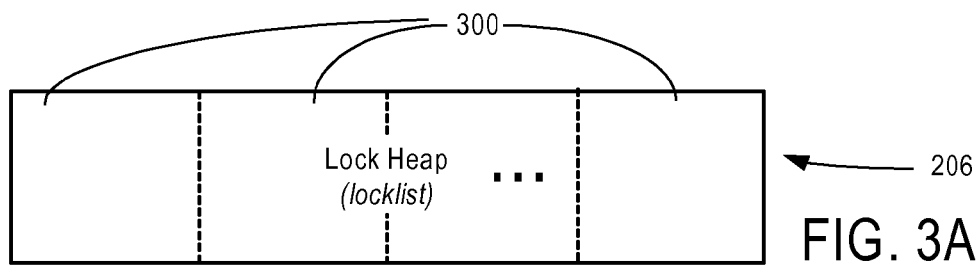
FIG. 3A shows a schematic block diagram of a locklist formed by a plurality of page groupings in accordance with an embodiment.

As shown in FIG. 3A, in accordance with an embodiment, the locklist may be structured into smaller memory blocks that will be referred to in this specification as page groupings 300. The number of page groupings 300 in a locklist 206 is determined by the selected size of the page groupings 300, and the amount of memory allocated to the locklist 206.

Figure 3B:
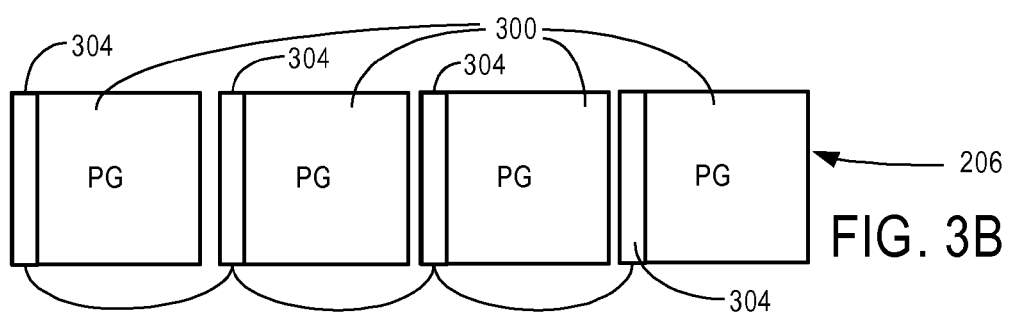
FIG. 3B shows a schematic block diagram of individual page groupings linked together by their page grouping control blocks to form a chain of page groupings.

FIG. 3B shows a number of page groupings 300 that may be linked together in a chain of page groupings 300 to form the locklist 206. As shown, the page groupings 300 may be linked via a page grouping control block 304 associated with each page grouping.

Figure 3C:
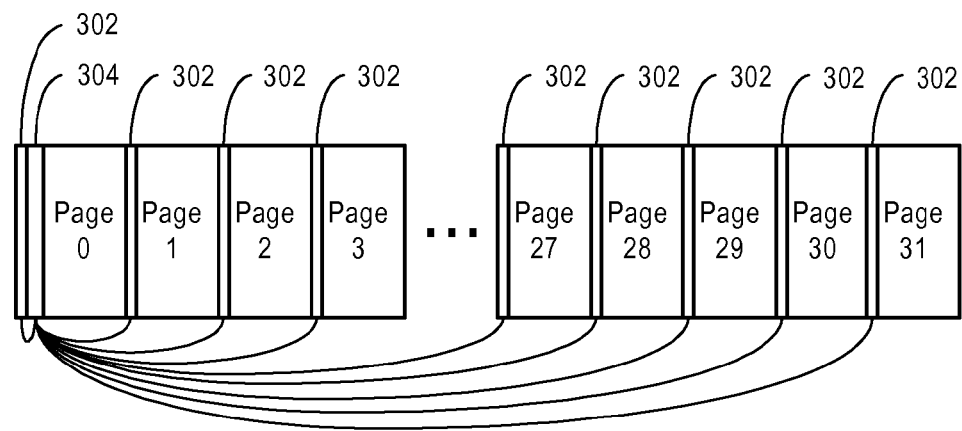
FIG. 3C shows a more detailed view of a page grouping as may be found in the locklist of FIGS. 3A and 3B.

FIG. 3C shows a more detailed view of a page grouping 300 as may be found in the locklist of FIGS. 3A and 3B. As shown, a page grouping 300 may be configured as 32 pages (page 0 through page 31). Each page may have a page header 302 pointing to a page grouping control block 304 (shown in page 0). The page grouping control block 304 may hold information about the state of all free LRBs (see FIG. 3D) within all pages of the page grouping. The size of each page within a page grouping may be some power of 2 (e.g. a page size of 4K).

Figure 3D:
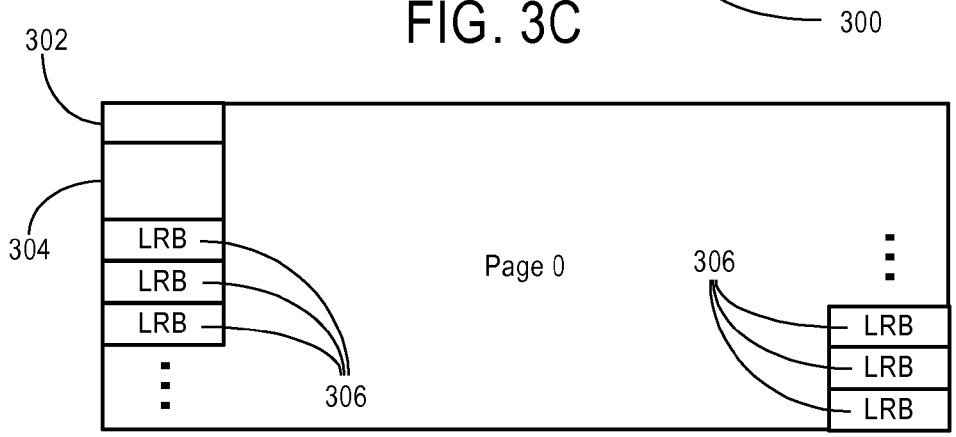
FIG. 3D shows a detailed view of a page initialized with lock request blocks (LRBs)

As shown in FIG. 3D, each page may be segmented into smaller sub-blocks of memory that will be referred to in this specification as lock request blocks or LRBs 306. LRBs 306, as described above in Table A, are the individually addressable memory blocks that may be used by a database agent to manage transaction concurrency. The LRBs 306 within a page may be linked in a chain, with the first LRB in the chain being referenced from the page grouping control block 304.

The number of LRBs 306 in a page grouping may be determined by the size of each LRB 306, the size of each page, and the size of any page headers or control blocks within the page. For example, with a page size of 4K, each page may contain approximately 63 individual LRBs. For the purposes of illustration, assuming a page grouping with 32 pages, each page being 4K in size, each page grouping may be approximately 128K in size and have approximately 2000 LRBs.

given an LRB, it is possible to identify which page grouping it belongs to, simply by masking some of its memory address to get a pointer to a page header 302, which in turn will point to the page grouping control block 304.

The purposes and management of the LRBs will now be described. As a general overview, if there is a call for a decrease for the size (of memory allocation) of the locklist 206, a lock manager may look at the individual LRBs 306 within a page to determine whether the LRBs are used or free. Generally speaking, the lock manager will look for page groupings in which all LRBs are free. In the event a page grouping is not available for freeing, the memory manager will wait until a more opportune time. While waiting, the lock manager may actively attempt to reorganize the LRBs in memory (i.e. move LRBs from page groupings that are almost free to page groupings that are almost full), while putting a hold on usage of free LRBs from page groupings that are good candidates for being completely freed in the near future. As well, a general strategy of taking free LRBs from the first page grouping of the locklist and organizing the list of page groupings such that empty page groupings are last may help increase the likelihood of a successful decrease in allocation of memory for the locklist. For example, in an embodiment, allocations of LRBs may always be made from a specified page grouping (e.g. the first page grouping). Whenever a page grouping is completely used up, the page grouping is moved to the back of a list of page groupings. Likewise, if a page grouping becomes partly free, it can be moved back to the front of the list. This strategy may ensure that LRBs will be taken from fewer page groupings, thus decreasing the chance of fragmentation. The details of this strategy are now described.

As mentioned above, LRBs may be formed into pages within page groupings. The allocation of a locklist can begin by first obtaining the memory necessary to create a first page grouping. To begin initialization, the address of a first aligned page (e.g. page 0) in a page grouping can be located as a starting point. For the first page (page 0), a page header can be initialized. The page header may store a pointer to a page grouping control block that may also be initialized within the first page (page 0). Then, the page initialization can proceed by initializing LRBs sequentially, by advancing the pointer to each of the LRBs in the page. This page initialization process for the first page can then be repeated for all other pages in the page grouping, while omitting the process of initializing the page grouping control block, as this structure only exists on the first page. While initializing a page grouping in this manner, an LRB list can be built for just a single page grouping, rather than a global list for the entire locklist. The newly initialized page grouping may then be added to a chain of page groupings forming the locklist. The initialization of page groupings can continue as described above until the number of pages reaches the desired locklist size, rounding up to the next multiple of the page grouping size (e.g. 32), if necessary.

Figure 4:
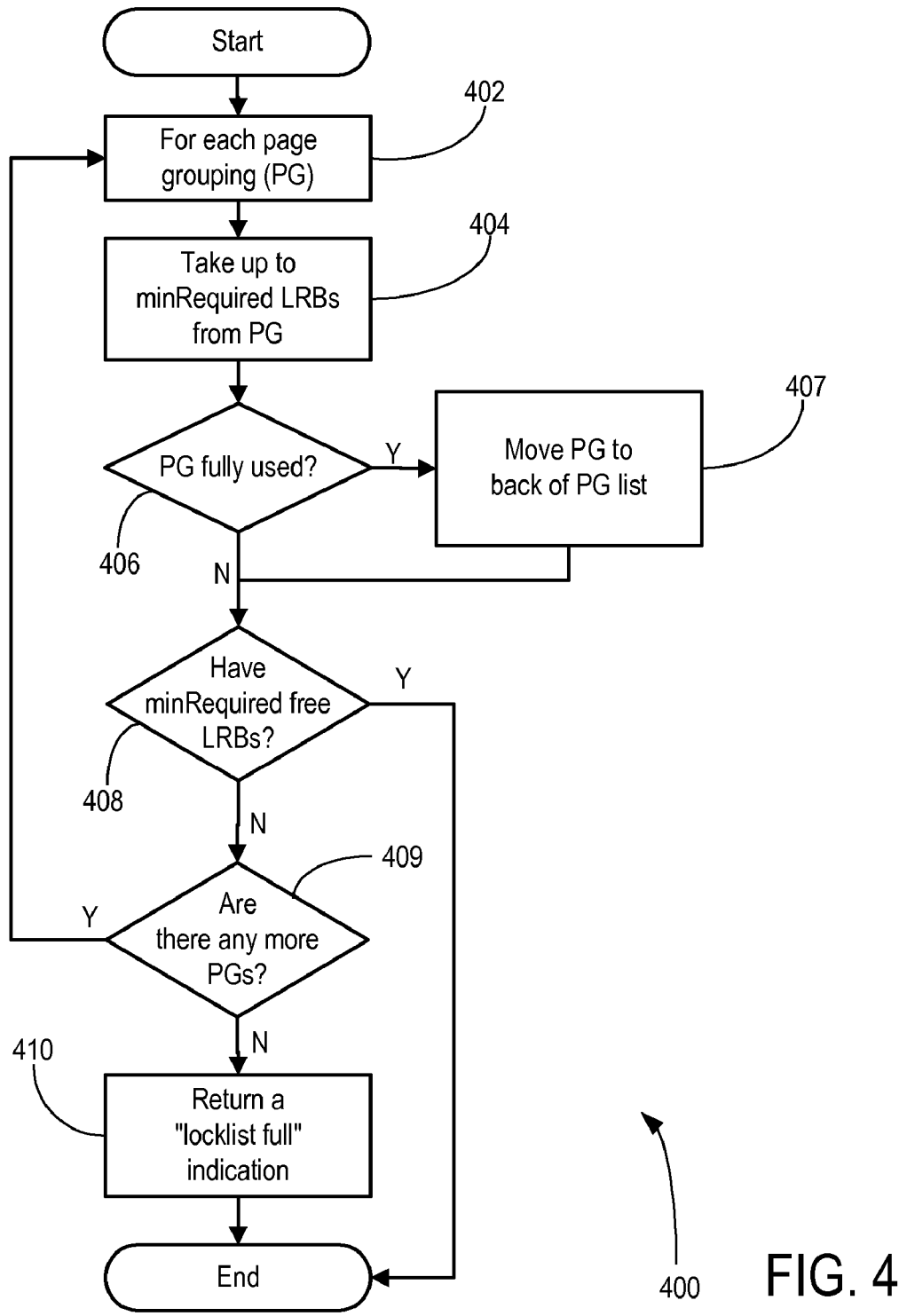
FIG. 4 shows a flowchart of a method of acquiring free LRBs from the locklist in accordance with an embodiment.

In the course of usage, if a lock manager finds that a first page grouping has some free LRBs, the lock manager may try to take the free LRBs in order to consolidate LRB usage within the page groupings. An illustrative example of a method 400 for taking LRBs is now described with reference to FIG. 4. At block 402, for each page grouping not fully used, the following steps are performed. At block 404, take up to minRequired number of LRBs from the current page grouping and goto decision block 406. If, at decision block 406, a page grouping has become fully used, that page grouping is moved to the back of a page grouping list at block 407. At decision block 408, if the minRequired free LRBs have been taken from the current page grouping, method 400 may exit. Otherwise, method 400 proceeds to decision block 409. At decision block 409, if there are any more page groupings, method 400 will retry starting at block 402 with the next page grouping in the locklist page grouping chain. This will be repeated until minRequired LRBs are taken from the locklist or until all page groupings in the locklist have been traversed using this method. At decision block 409, if there are no more page groupings, method 400 returns a "locklist full" indication at block 410 and exits.

Figure 5:
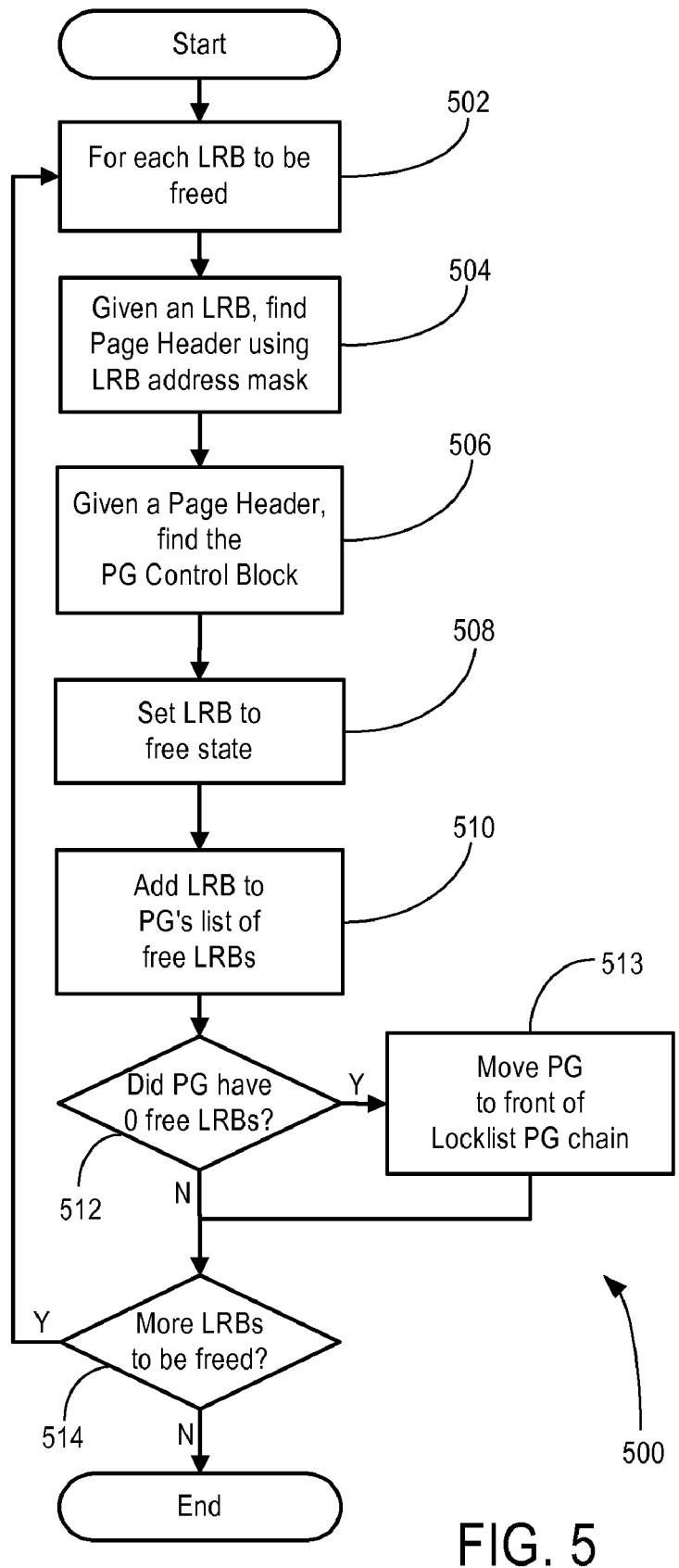
FIG. 5 shows a flowchart of a method of freeing used LRBs back to the locklist.

Referring to FIG. 5, when a database agent releases some LRBs back to the page groupings list (e.g. when a transaction no longer requires some locks), the released LRBs must be returned to the correct page groupings. To do this, the lock manager can exploit the fact that all of the pages are aligned on page boundaries, with page headers linked to a page grouping control block. At block 502, for each LRB to be freed, method 500 may proceed to block 504 to find a page header corresponding to the LRB using an address mask. At block 506, given the page header, method 500 may locate the page grouping control block. At block 508, the LRB may be set to a free state, and at block 510, method 500 may add the LRB back to the page grouping's list of free LRBs. At decision block 512, if the page grouping in question was recently empty, the page grouping may be moved to the front of the locklist page grouping chain at block 513. If the answer at decision block 512 is no, method 500 can proceed to decision block 514, where method 500 may determine if there are more LRBs to be freed. If no, method 500 ends. If yes, method 500 may return to block 502 to repeat the steps.

In method 500, above, it will be observed that at block 513 recently empty groupings are placed at the head of the page groupings list. This is so that page groupings can be freed more easily when the locklist configuration parameter is decreased. The rationale is that, if there is a large number of LRBs available, and only a small number of them are being used, then the LRBs will always come out of some small number of page groupings at the beginning of the page groupings list.

Figure 6:
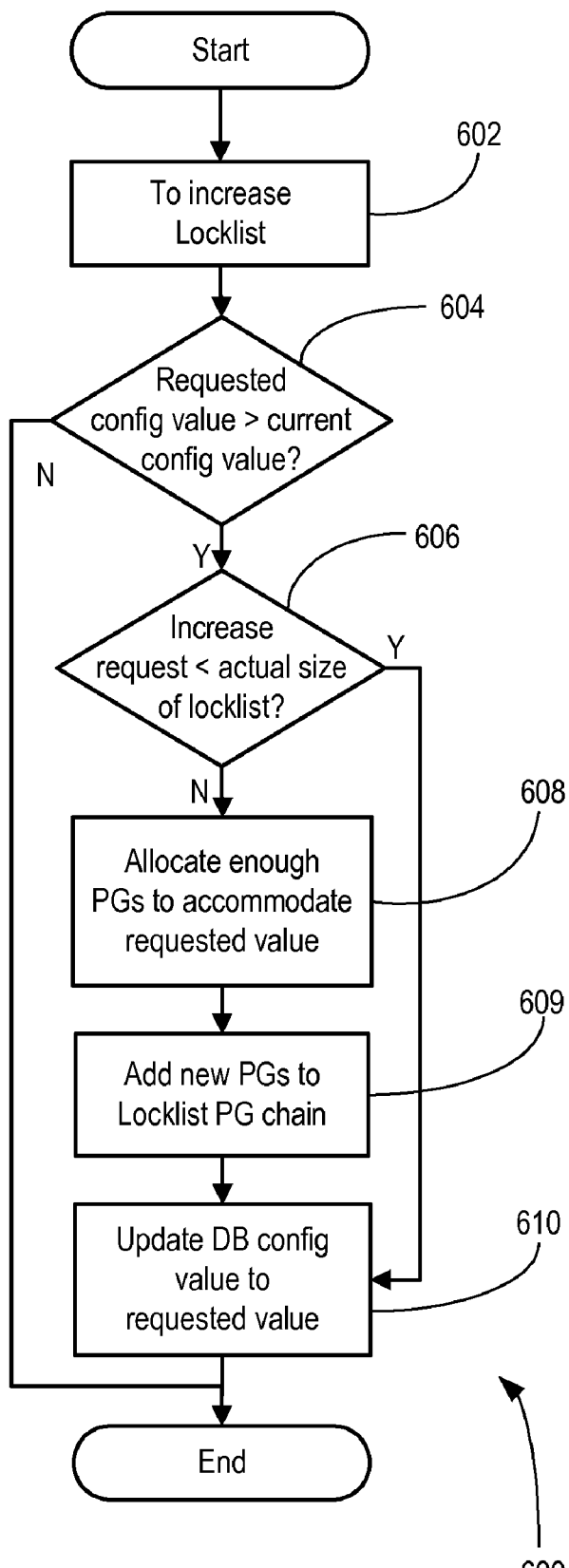
FIG. 6 shows a flowchart of a method of increasing a locklist in accordance with an embodiment.

When a request is made for an increase in the allocation of locks, the operation at the lock manager level may be illustrated as follows. FIG. 6 shows an illustrative method 600 for increasing memory allocation for a locklist as may be required. At block 602, in order to increase the locklist, method 600 proceeds to decision block 604 and determines if the requested config value is greater than the current config value. If at decision block 604, the answer is no, method 600 ends. If at decision block 604, the answer is yes, method 600 may proceed to block 606 and determine if the increase request is less than the actual size of the current locklist. Since the locklist is made up of page groupings, but the config parameter is not required to be a multiple of the page grouping size, it may not be necessary to add more page groupings to fulfill a locklist increase request. If at decision block 606, the answer is yes, the method may proceed to block 610, update the config value to the requested config value, and then end. If at block 606 the answer is no, method 600 proceeds to block 608 to allocate enough page groupings to accommodate the increased amount over the current configuration size. Method 600 may then proceed to block 609, where the newly allocated page grouping(s) are added to the locklist page grouping chain. In an embodiment, the newly allocated page grouping(s) will be added to just before the first completely full page grouping. If there is none, the page grouping(s) will be added to the back of the page grouping list. Method 600 may then proceed to block 610, where the database configuration value for the locklist is updated to reflect the requested config value, and then end.

As in the case for increasing the memory allocation, if the decrease amount is small and would not allow for the freeing of a whole page grouping, the locklist may be logically decreased (i.e. the configuration value may be adjusted), but no attempt is made to free any page groupings.

If the recommended decrease is sufficiently large, then an attempt will be made to decrease the physical size of the locklist. If there are not enough empty page groupings (i.e. page groupings with all LRBs free) to satisfy the resize request, then the request may have to wait.

In an embodiment, the memory manager may wait to decrease the locklist size. This may occur if the locklist usage is greater than the decrease size. For example, the locklist may be 100 pages, and 80% of the locklist may be in use when a request for a decrease to 70 pages is made. In such a case, the requested decrease cannot be made until the locklist usage decreases to below at least 70%.

Alternatively, the locklist usage may be less than the requested decrease size, but memory usage may be fragmented. For example, there may be four page groupings with 3% usage of the locklist, but the 3% may comprise three of the page groupings using 1% each. If a user requests a decrease of the locklist to half its size, this request may not be immediately met as only one of the page groupings is free.

As an illustrative example, decreasing the size of a locklist may proceed as follows. If the initial size of a locklist is 220 pages (i.e. the current configured locklist size is 220 pages), and the actual locklist size is 224 pages (i.e. 32 pages*7), if the locklist is decreased to 210 pages then the actual locklist size is not disturbed. However, if the current configured locklist size is decreased to 175 pages, the actual locklist size may be decreased by 32 pages to 192 pages (i.e. 32 pages*6).

Figure 7A:
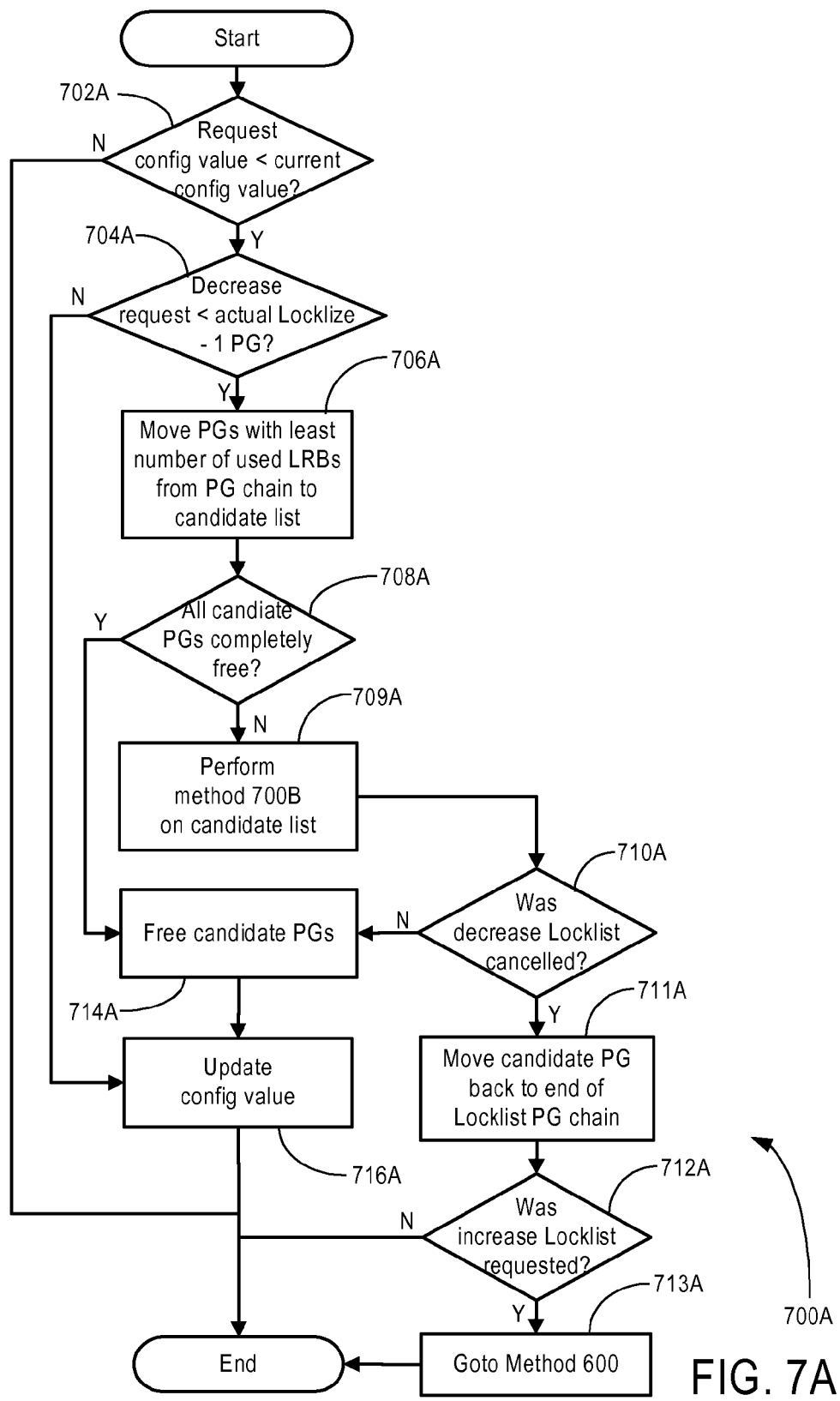
FIGS. 7A, 7B and 7C show an illustrative method of decreasing a locklist in accordance with an embodiment.
Figure 7B:
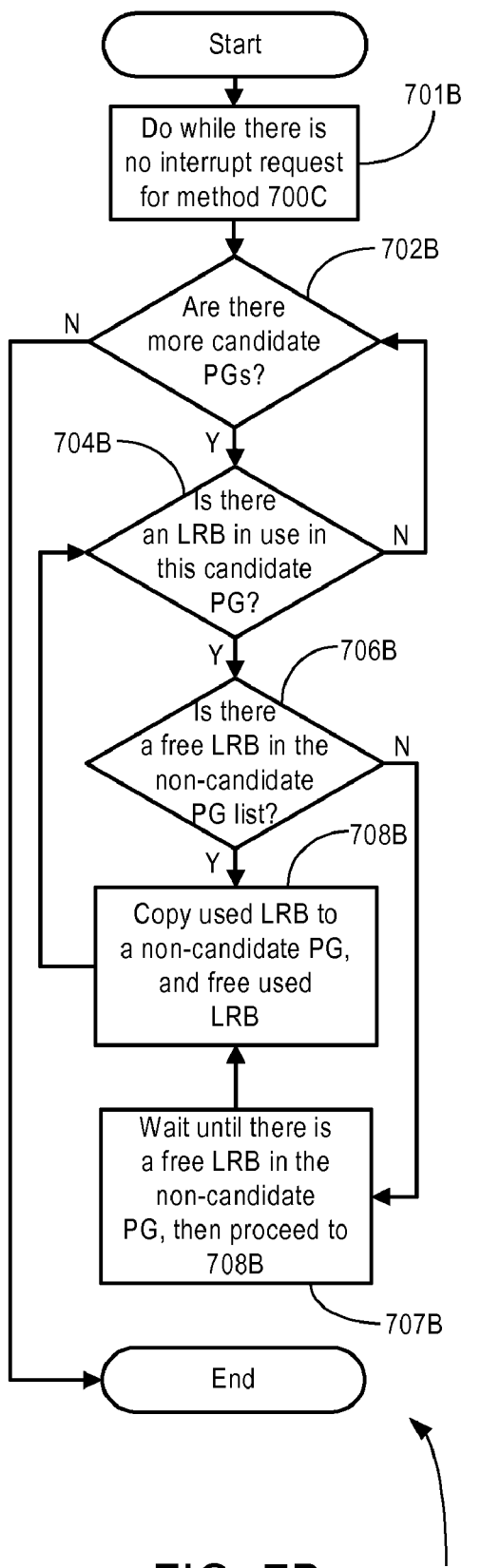
Figure 7C:
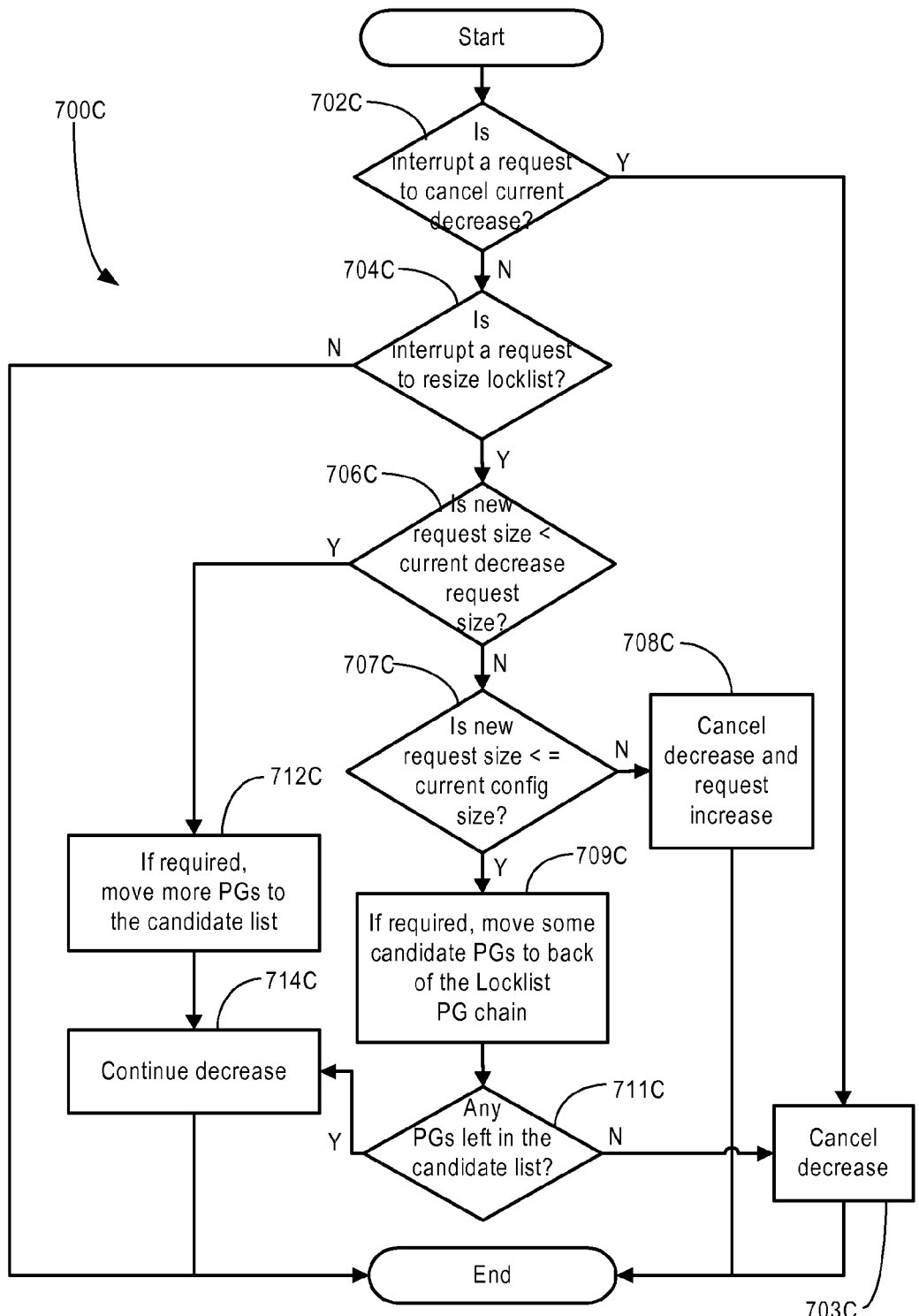

Now referring to FIGS. 7A, 7B and 7C, shown is an illustrative method 700 for decreasing the memory allocation for a locklist in accordance with an embodiment. Method 700A begins at block 702A where a decision is made whether the requested config value is less then the current config value. If no, then the method 700A ends. If yes, method 700A proceeds to block 704A, where it is decided if freeing of any page groupings is required to fulfill the decrease request. As in the case for increasing the memory allocation, if the decrease amount is small and would not allow for the freeing of a whole page grouping, the locklist may be logically decreased (i.e. the configuration value may be adjusted), but no attempt is made to free any page groupings. If at decision block 704A the answer is no, method 700A proceeds to block 716A to update the current config value and then ends. If yes, method 700A proceeds to block 706A and moves the required number of page groupings from the page groupings chain to the candidate list chain so that their free LRBs, if any, can no longer be accessed.

In an embodiment, candidate page groupings are chosen as page groupings with the least number of used LRBs. This information is stored in each page grouping's control block. From block 706A, method 700A proceeds to decision block 708A, where method 700A determines if all the candidate page groupings are completely free. If yes, method 700A proceeds to block 714A, where all the candidate page groupings are freed. Then, method 700A proceeds to block 716A to update the current config value, and method 700A ends. If at decision block 708A the answer is no, method 700A proceeds to block 709A where method 700B is performed on the candidate page groupings in an attempt to defragment LRB usage.

When method 700B completes, method 700A proceeds to decision block 710A, where method 700A determines if the locklist decrease request was cancelled. If no, this means that method 700B was successful in defragmenting the candidate page groupings, and method 700A proceeds to block 714A, where all the candidate page groupings are freed, and method 700A then proceeds to block 716A to update the current config value and end. If yes, the method 700A proceeds to block 711A where all the candidate page groupings are moved back to the end of the locklist page groupings list. Method 700A then proceeds to decision block 712A where it is determined if a locklist increase was requested. If method 700B had received an interrupt to resize the locklist to a size greater than the current config value, then the decrease request would have been cancelled and an increase request would have been made. If yes, method 700A proceeds to method 600 and ends. If no, then method 700A ends.

Referring to FIG. 7B, while waiting to decrease a locklist, and while no interrupt request is received at block 701B, block 702B of method 700B processes each candidate page grouping in an attempt to defragment LRB usage amongst the page groupings. It does so by determining if there is a candidate page grouping with an LRB in use. If no, then method 700B ends. If yes, method 700B proceeds to block 704B where it is determined if all the LRBs within the current candidate page grouping are free. If no, method 700B returns to block 702B to process the next candidate page grouping. If yes, method 700B proceeds to decision block 706B to determine if there is a free LRB in the non-candidate page grouping list that can be used to copy a used LRB from the current candidate page grouping. If no, method 700B proceeds to block 706B where it will wait until locklist use decreases, and a free LRB becomes available in a non-candidate page grouping. If yes, method 700B proceeds to block 708B where the used LRB is copied to a free LRB of a non-candidate page grouping. The used LRB is freed, and method 700B returns to block 704B to continue processing all other used LRBs within this page grouping. If a non-candidate page grouping becomes empty, it is moved to the back of the page grouping list, as described earlier with reference to method 400 of FIG. 4.

As part of the copy procedure, a lock manager redirects pointers to the new copy of the LRB. Given an LRB, the lock manager will know which pointer to redirect as each used LRB contains information about the transaction it belongs to. Likewise, the newly freed LRB is returned to the correct page grouping using method 500 described earlier (FIG. 5). During the copy process and redirection of pointers, serialization is achieved using latches that serialize access to a transaction's locks and latches that serialize access to free LRBs within page groupings. Method 700B ends when all candidate page groupings are freeable, or if the method is interrupted and method 700B proceeds to method 700C.

Referring to FIG. 7C, method 700C proceeds if an interrupt is received during processing of method 700B. The interrupt may cause cancellation of the current decrease operation, reduction of the size of the current decrease operation, or cancellation of the decrease operation and performance of an increase operation. Method 700C begins at block 702C, where it is determined if the interrupt is a request to cancel the current decrease operation. If yes, method 700C cancels the decrease operation and ends. Method 700A may return any candidate page groupings to the locklist page grouping chain. If no, method 700C proceeds to decision block 704C, where it is determined if the interrupt is a request to resize the locklist. If yes, method 700C proceeds to decision block 706C, where it is determined if the new requested config size is less than or equal to the current decrease size. If yes, method 700C proceeds to block 712C, where, if required, more page groupings will be moved to the candidate list as the decrease amount has been increased. Method 700C then proceeds to block 714C, where method 700C continues the decrease request, and ends to resume method 700B. If no, then method 700C proceeds to decision block 707C where it is determined if the new requested config size is less than or equal to the current config size.

At decision block 707C, if the answer is no, method 700C proceeds to block 708C where the decrease request is cancelled and an increase request is made, and method 700C ends. If yes, then method 700C proceeds to block 709C where, if required, candidate page groupings with the most number of used LRBs are moved back to the locklist page grouping list. This is done because the decrease amount may have been reduced. Method 700C then proceeds to decision block 711C, where it is determined is there are any more page groupings left in the candidate list. If no, then the decrease request is cancelled at decision block 714C and method 700C ends.

Self-Tuning Memory Manager

As will now be described, a memory manager may be suitably configured to determine an appropriate allocation of the total available memory to give to each of the memory consumers within a shared memory set. In the illustrative example shown earlier in FIG. 2A above, allocating more memory to the lock heap or locklist 206, for example, would result in less memory allocated for some of the other memory consumers, such as the catalog cache 204, or the package cache 208.

In an embodiment, the memory manager may receive input on the status of various measurements for a tuning interval that has just finished. Based on this feedback, the memory manager may make "self-tuning" adjustments appropriate for the database workload. This will be explained in more detail below.

In an embodiment, the memory manager may also be configured to grow or shrink the size of a database shared memory set available to a number of memory consumers. For example, the size of a database shared memory set may be increased at the expense of operating system memory. Alternatively, the size of the database shared memory set may be decreased in order to return memory back to the operating system.

In an embodiment, the memory manager may be configured to determine optimal values for various configuration parameters with a goal of maximizing the number of concurrent connections by database agents or processes while at the same time minimizing lock escalation. As known to those skilled in the art, lock escalation occurs when, for example, it becomes necessary to lock an entire database table rather than only selected records in the table due to a lack of locklist memory.

Based on the amount of memory available in the database shared memory set 200 (FIG. 2A) and in the system memory (e.g. memory 106 of FIG. 1), the memory manager may recommend a suitable memory allocation to the locklist 206. This configuration parameter recommendation can then be assessed to determine if resizing of the locklist is called for, and if so, whether such a resizing of the locklist is feasible based on the requirements of other memory consumers within the database shared memory set 200.

Rather than determining the optimal values for the configuration parameters one-time, or infrequently, the memory manager may be configured to determine optimal values at regular, predetermined tuning intervals. As noted above in Table A, the tuning interval may be set to be, for example, between one minute and ten minutes. Thus, as demand for the locklist varies over time, the memory manager may recommend adjusting the memory allocation for the locklist as may be appropriate, and determine optimal configuration parameter values corresponding to the recommendation. For example, the memory allocation for the locklist may be increased substantially to meet an unusually high peak demand for lock memory, and subsequently be decreased over one or more successive tuning intervals to a more appropriate level.

In order to adjust the memory allocation for the locklist as described above, it is necessary for the locklist memory size to be resized dynamically (i.e. without having to stop and start the database).

As will now be described, the memory manager may be configured to adjust the memory allocation for the locklist based on a marginal cost/benefit analysis, as may be reported to the memory manager by each memory consumer in the database shared memory set (FIG. 2). The memory manager may also take into account a minimum amount of memory required by each of the memory pools, and this minimum size (i.e. minSize in Table A) may be used to override any recommended memory allocation based on the marginal cost/benefit analysis. For example, in the illustrative example described herein, the minSize for the locklist may be set to a suitable minimum value for the locklist memory pool that must be satisfied.

In order to accommodate any significant growth in memory requirements for the locklist between tuning intervals, the memory manager may be configured to maintain a specified portion or percentage of the locklist memory free.

For example, the memory manager may be set to maintain 50% of the locklist memory free. Should demand for the locklist memory exceed the free locklist memory, then the additional memory requirement may be met by an overflow memory area inside the database shared memory set. This overflow memory (defined above in Table A) may be an area of memory that is kept free to accommodate only short-term emergency memory requirements by one or more of the memory consumers.

Resizing the locklist may also be performed regularly at the end of each tuning interval. However, to aid in system stability, any decrease in locklist memory may be initiated only if the locklist memory is grossly underused. Any decrease may also be applied in smaller increments by adopting a conservative locklist memory reduction strategy.

As will become apparent, systems, computer program products, and methods for managing locklist memory in accordance with various embodiments of the invention are designed to consume memory "on-demand" from the database shared memory set in order to avoid lock escalation. The basic tuning model to achieve this is now described.

Basic Tuning Model

Figure 8:
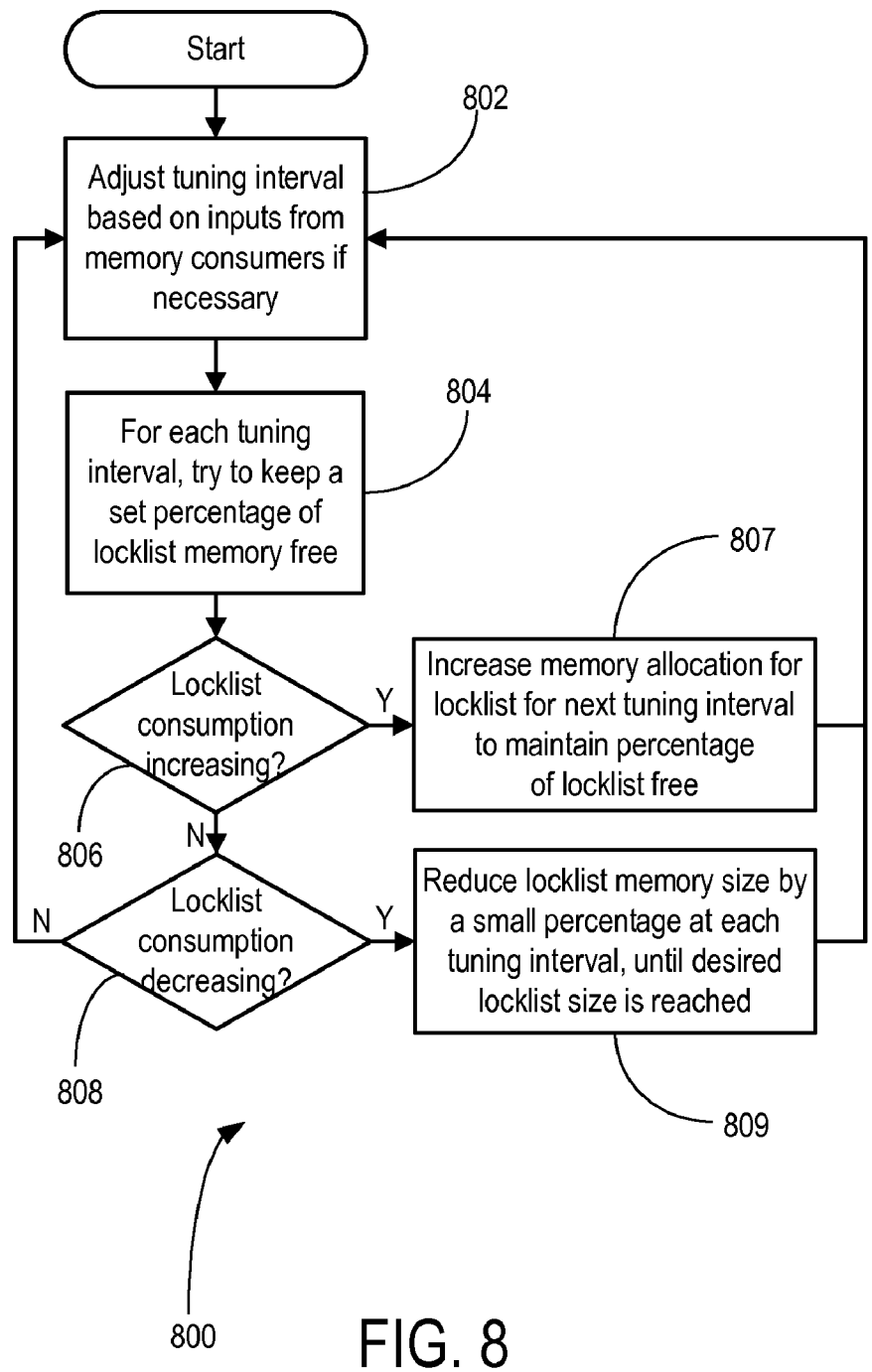
FIG. 8 shows a basic tuning model for a memory manager in accordance with an embodiment.

Referring to FIG. 8, shown is a basic tuning model, represented by method 800, that may be embodied in a "self-tuning" memory manager that may assess the database memory requirements during a tuning interval. At block 802, the tuning interval may be adjusted as necessary based in part on inputs from various memory consumers. At block 804, for each tuning interval, the memory manager may be configured to aim to keep a set portion or percentage of all locklist memory free (e.g. STMM_LOCKLIST_MIN_PCT_FREE).

At decision block 806, method 800 determines whether locklist consumption grows during a tuning interval. If yes, method 800 may proceed to block 807 where the memory manager may be configured to increase the locklist memory allocation for the next tuning interval, such that the percentage of free locklist memory free is maintained at some desirable level (e.g. STMM_LOCKLIST_MIN_PCT_FREE objective). Method 800 may then return to block 802 and continue. If no, method 800 may continue to decision block 808.

At decision block 808, method 800 determines if locklist memory consumption decreases substantially during a tuning interval, i.e. much more than STMM_LOCKLIST_MIN_PCT_FREE empty. If yes, method 800 may proceed to block 809 where the memory manager may be configured to reduce the locklist memory size by a small percentage (e.g. STMM_LL_FREEBLOCK_DECREMENT_RATE) for the next several tuning intervals, until the STMM_LOCKLIST_MIN_PCT_FREE empty state is achieved. If no, method 800 may return to block 802 and continue.

By keeping STMM_LOCKLIST_MIN_PCT_FREE of the locklist memory free during a tuning interval, the system can accommodate a large growth in locklist memory consumption during that tuning interval.

Any sudden spikes in usage that exceed the locklist memory allocation may temporarily use memory from an overflow memory area in order to avoid lock escalations. However, for massive spikes when the overflow memory area is also constrained, lock escalation may be unavoidable. In such a case, the locklist memory allocation may be increased (e.g. doubled) for each tuning interval while escalations are continuing.

Figure 9:
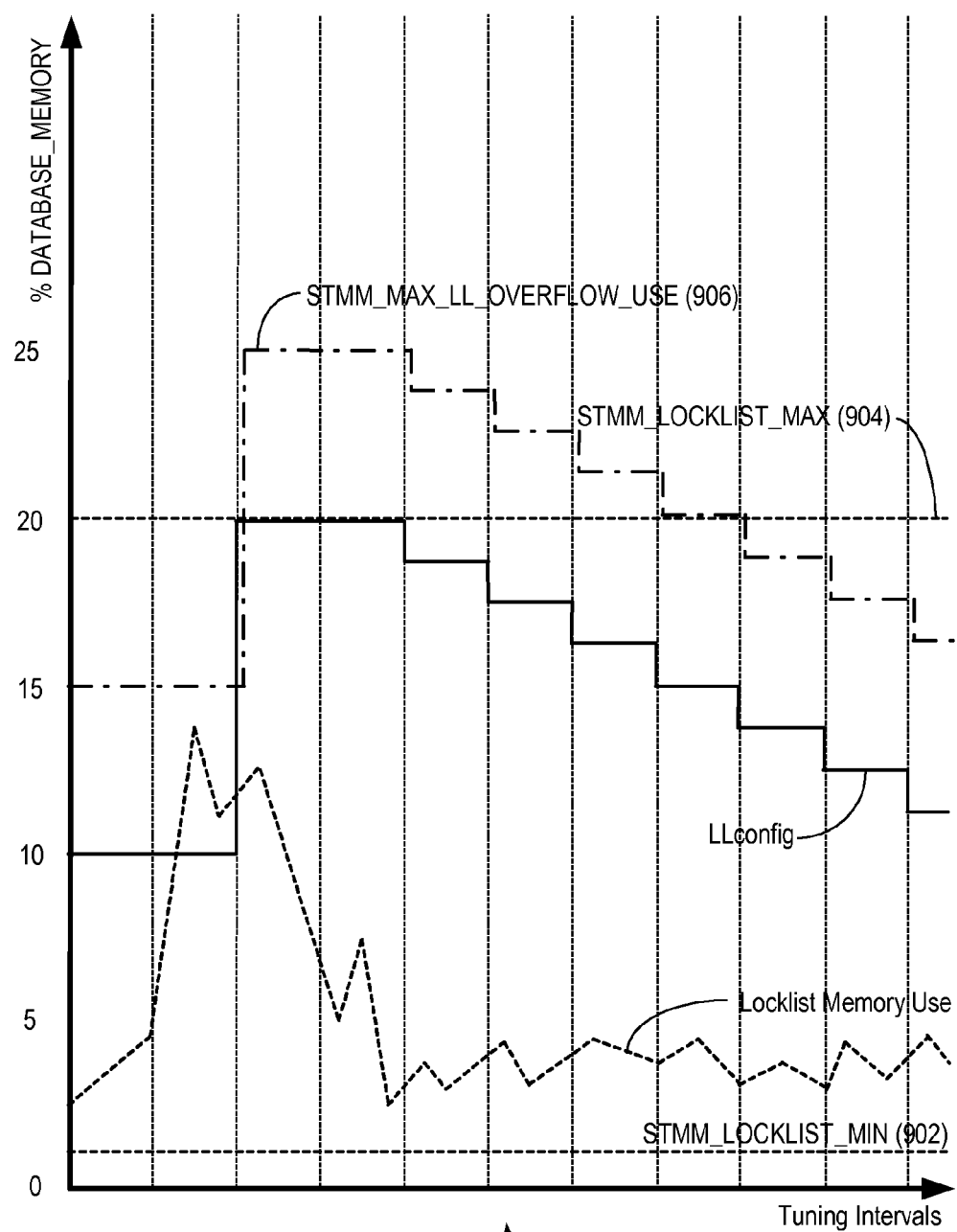
FIG. 9 shows a schematic representation of tuning a locklist over a number of tuning intervals.

However, as shown in FIG. 9, reasonable limits on the minimum size 902 and maximum size 904 of the locklist (e.g. based on a percentage of total system memory) may constrain the growth pattern. As well, in order to maintain compatibility with other memory consumers, the increments or decrements to the locklist memory allocation size may be integral units of memory of a specified size (e.g. 128K).

Still referring to FIG. 9, in an embodiment, the locklist memory allocation size may be kept at no smaller than STMM_LOCKLIST_MIN, which can be expressed as:

$$STMM\_LOCKLIST\_MIN = MAX(0.01*DATABASE\_MEMORY, 500*locksize*num\_agents) \quad [1]$$

where DATABASE_MEMORY is the total system memory available. In equation [1] above, the minimum locklist memory allocation STMM_LOCKLIST_MIN is the larger of 500 locks per agent of size locksize, or 1% of database shared memory. This minimum value may be evaluated by the memory manager at each tuning interval.

In an embodiment, the minimum and maximum memory allocations for the locklist may be expressed as follows. The maximum size of the locklist may be kept no larger than STMM_LOCKLIST_MAX, which may be expressed as 20% of the database memory, for example:

$$STMM\_LOCKLIST\_MAX = 0.20*DATABASE\_MEMORY \quad [2]$$

Still referring to FIG. 9, when consuming memory from the overflow memory area 906 during a synchronous locklist size update, locklist size may be constrained to a maximum of percentage of the overflow memory area size available at the time of the synchronous locklist size increase. For example, the maximum percentage of the overflow memory area 906 available for use by the locklist (STMM_MAX_LL_OVERFLOW_USE) may be set at 65%:

$$STMM\_MAX\_LL\_OVERFLOW\_USE = 0.65*overflow\_memory\_size \quad [3]$$

where overflow_memory_size is the overflow memory area size available in the database, as calculated by the value of DATABASE_MEMORY less the sum of all memory pools or heaps in the database shared memory set (this sum excludes any memory used by the locklist within the overflow memory area at the time of the calculation of the sum). In other words, in an embodiment, locklist size will not be allowed to grow beyond a predefined percentage of database shared memory, and will not be allowed to consume more than a fixed percentage of free space within the overflow memory area.

In an embodiment, the "internal" size objective for the locklist is the amount of memory that the lock manager requires to ensure that there is some room for future growth. This may be expressed as the targetSize, or as the memory manager input parameter minSize, for example. The use of overflow memory is not reflected in the "external" size configuration value. In the case of locklist memory, this value is LLconfig (see Table A, above).

For asynchronous growth of the locklist size, it is possible for targetSize to be larger than LLconfig, since the lock manager may be consuming overflow memory, and it may take more than one tuning interval to converge. When shrinking the locklist memory allocation size, targetSize and LLconfig may be the same, except during a momentary transition while memory is being freed.

Real-time growth of the locklist memory size may be critical in order to avoid lock escalation. To achieve this, the self-tuning memory manager may use a combined "synchronous" and "asynchronous" approach.

Asynchronously, for each tuning interval, the memory manager will attempt to keep free a set amount of the locklist memory. In an embodiment, this free amount may be somewhere in the range between STMM_LOCKLIST_MIN_PCT_FREE and STMM_LOCKLIST_MAX_PCT_FREE.

A suggested value for STMM_LOCKLIST_MIN_PCT_FREE is 50% (i.e. 50% of LLconfig). A suggested value for STMM_LOCKLIST_MAX_PCT_FREE would be somewhat higher, such as 60% (i.e. 60% of LLconfig). During normal operations, if locklist size is maintained between STMM_LOCKLIST_MIN_PCT_FREE and STMM_LOCKLIST_MAX_PCT_FREE free, constant modification of the locklist size may be avoided.

By keeping roughly half of the locklist free, the database engine can absorb as much as a 100% growth in lock requests without requiring a "synchronous" increase in the locklist size. However, if lock requests grow beyond 100% during a single tuning interval, and the locklist becomes constrained (i.e. 100% used) the lock manager may allocate new lock memory blocks from the overflow memory, as may be required, up to the constraints described above for locklist maximum size. The consumption of memory from the overflow memory is only temporary. At subsequent tuning intervals, the memory manager will adjust memory distributions to repopulate overflow memory to its allocation goal (i.e. by reducing other memory heaps).

If the locklist size grows into the overflow memory area, the targetSize (the memory manager input parameter minSize) for locklist size will be increased to the current locklist size, but the LLconfig value will remain unchanged. During subsequent tuning intervals, the memory manager will attempt to restore the overflow memory to its objective size by reducing memory allocation for other memory consumers, and increasing the LLconfig setting until it reaches targetSize. This could potentially require more than one tuning interval depending on the availability (i.e. the liquidity) of memory in other heaps. Once LLconfig is converged with targetSize, and overflow memory is no longer used for locklist, the targetSize may be readjusted to the minimum size as described earlier.

If synchronous allocation fails, targetSize can be set, for example, to be double the current locklist size in order to affect at least an asynchronous increase in locklist size for the next tuning interval.

As noted above, optimal usage of available memory resources may also require a decrease in the memory allocation for the locklist memory. The motivation for shrinking locklist memory allocation size comes from the recognition that certain occurrences—such as occasional batch processing of updates, inserts and deletes (rollout), poor access plans, occasional statements from poorly design applications, and peak concurrency times—can lead to a time-limited need for a very large number of locks that are not required during normal operational periods. Because these peak pressures on a locklist may only be short lived (e.g. a few hours per week or per month) it may not make any sense to permanently reserve the peak memory requirements for the locklist.

As discussed above, in an embodiment, the locklist is only reduced when there are more than STMM_LOCKLIST_MAX_PCT_FREE free in the lock allocation chain (implying that the locklist is grossly underutilized). A method for shrinking the locklist memory allocation using an asynchronous reduction policy will now be described.

At the boundary of each tuning interval (e.g. generally between 1 and 10 minutes), a small percentage of the entirely free blocks (i.e. the chain of 128 KB block used to allocate locks) on a chain of locks will be freed back to other memory consumers tuned by memory manager, or back to DATABASE_MEMORY if overflow memory is below its objective, down to a minimum of STMM_LOCKLIST_MAX_PCT_FREE.

The decrement rate of the locklist memory allocation size may be called STMM_LL_FREEBLOCK_DECREMENT_RATE, which may be a percentage rounded to the nearest number of 128K blocks, for example. As an illustrative example, a value of 5% can be used for STMM_LL_FREEBLOCK_DECREMENT_RATE. As previously mentioned, there may be a spread between STMM_LOCKLIST_MIN_PCT_FREE and STMM_LOCKLIST_MAX_PCT_FREE (e.g. a spread of 10 percentage points) in which the locklist size is left untouched, avoiding constant adjustment of the locklist size.

In an embodiment, the memory manager can be configured to set the maximum portion of locklist memory that may be consumed by a single transaction. By way of example, in IBM DB2, MAXLOCKS is this parameter. Making MAXLOCKS too large can lead to excessive locking, lock wait and lock escalation scenarios, having a very serious negative effect on the performance of the database system. Conversely, making MAXLOCKS too small can also lead to excessive lock escalation, or poor use of lock memory.

In an embodiment, as shown in graph 1000 of FIG. 10, the maximum portion of locklist memory that may be consumed by a single transaction may be adaptive. For example, the MAXLOCKS parameter may be increased to provide a larger number of locks if the number of active locks is far below the total that are possible to allocate at any moment in time (i.e. the maximum possible value for LOCKLIST, as defined above). Thus, while there is no memory constraint, MAXLOCKS may remain high.

As lock usage on the systems grows towards a memory constraint, MAXLOCKS may be adaptively reduced. This throttling of the MAXLOCKS parameter may become more aggressive as the locklist memory becomes constrained. By way of example, a possible model may be one in which MAXLOCKS is initially hardly unconstrained (at 98% or 99% free locklist memory), but which is throttled as the locklist size approaches its maximum (e.g. 20% of database memory, or has grown to STMM_MAX_LL_OVERFLOW_USE % of overflow memory area size). The closer the locklist size grows to its maximum, the lower MAXLOCKS is set, dropping down to 1 lock when locklist size is 100% of its maximum size.

The above model of MAXLOCKS may an exponential curve to provide smooth behaviour. The expression used here is $P(1-(x/100)^5)$ where P is the maximum percentage of the locklist size that a transaction can consume when locklist size is not near its maximum size, and x is the percentage of the current potential maximum locklist size that is currently in use. By way of example, P may be set at 100.

MAXLOCKS will be re-computed every time the locklist is resized, or at every modulo STMM_LOCK-LIST_SYNCH_ TUNING_INTERVAL request for new locks. It will be reflected in the user viewable configuration parameter at tuning intervals. The inventors believe that this technique for throttling the maximum portion of locklist memory that may be consumed (e.g. throttling MAXLOCKS in IBM DB2) is unique.

While various illustrative embodiments have been described above, it will be appreciated by those skilled in the art that variations and modifications may be made. For example, while the systems, computer program products, and methods described above may be applicable to locklist memory, it will be appreciated that the systems, computer program products, and methods may be adapted to manage allocation of memory resources to other types of memory pools used by other memory consumers.

Thus, more generally, the scope of the invention is defined by the following claims.

What is claimed is:

1. A data processing system implemented method for resizing a memory pool in a database management system, comprising:
   i) forming the memory pool from at least one page grouping;
   ii) if an increase in allocation to the memory pool is required, adding at least one page grouping to the memory pool to form a chain of page groupings, wherein each page of the at least one page groupings comprises a plurality of memory blocks;
   iii) if a decrease in allocation to the memory pool is required, identifying at least one page grouping free of used memory blocks that are available to be freed from the memory pool, and freeing the at least one page grouping from the memory pool;
   iv) if no page grouping that is available to be freed from the memory pool is identified in iii), then copying all used memory blocks from each page grouping in a candidate list of at least one page grouping having at least one used memory blocks, to another page grouping in order to free each page grouping in the candidate list, of used memory blocks,
   wherein if an interrupt occurs in iv) to cancel the decrease in allocation, the decrease in allocation is canceled,
   wherein if an interrupt occurs in iv) to further decrease allocation to the memory pool, at least one additional page grouping is added to the candidate list, and
   wherein if an interrupt occurs in iv) to further increase allocation to the memory pool, at least one page grouping is removed from the candidate list.

2. The data processing system implemented method of claim 1, further comprising:
   v) once the candidate list of at least one page grouping is free of used memory blocks, freeing the at least one page grouping of the candidate list from the memory pool.

3. The data processing system implemented method of claim 1, further comprising identifying the candidate list of at least one page grouping that are available to be freed from the memory pool based on the amount of free memory blocks in the at least one page grouping.

4. The data processing system implemented method of claim 3, wherein each page grouping comprises a plurality of pages each including a page header pointing to a page grouping control block associated with the page grouping, and each page grouping control block contains information about whether each memory block in the page grouping are free or used, and the method further comprises accessing the page grouping control block to determine the location of free memory blocks in the page grouping.

5. The data processing system implemented method of claim 4, further comprising organizing the page groupings into a list of page groupings based on the amount of free memory blocks in each page grouping, and identifying the candidate list of at least one page grouping for freeing based on its order in the list of page groupings.

6. The data processing system implemented method of claim 5, further comprising using memory blocks from a page grouping based on its position in the list of page groupings such that memory blocks are used from fewer page groupings, whereby fragmentation of used memory blocks amongst the page groupings is decreased, wherein the list of page groupings are sorted according to a number of unused memory blocks.

7. The data processing system implemented method of claim 6, wherein the memory pool is a locklist, and the memory block is a lock request block in the locklist.

* * * * *